United States Patent [19]
Fujiwara et al.

[11] Patent Number: 5,171,190
[45] Date of Patent: Dec. 15, 1992

[54] SYNCHRONOUS BELT

[75] Inventors: Akinori Fujiwara; Susumu Onoe; Michio Tanaka; Hiroshi Matsuoka; Tsutomu Shioyama, all of Kobe, Japan

[73] Assignee: Bando Chemical Industries, Ltd., Kobe, Japan

[21] Appl. No.: 875,679

[22] Filed: Apr. 29, 1992

[30] Foreign Application Priority Data

Apr. 30, 1991 [JP] Japan ................................ 3-099154
Apr. 30, 1991 [JP] Japan ................................ 3-099155
Oct. 28, 1991 [JP] Japan ................................ 3-281404

[51] Int. Cl.$^5$ ............................................. F16G 1/04
[52] U.S. Cl. .................................... 474/267; 139/383 R; 428/257; 428/258; 428/259; 474/205; 474/266
[58] Field of Search ................ 198/847; 474/205, 267, 474/266; 428/257, 258, 259; 139/383 R, 420 R

[56] References Cited

U.S. PATENT DOCUMENTS

| | | | |
|---|---|---|---|
| 4,302,197 | 11/1981 | Himura et al. | 198/847 |
| 4,533,420 | 8/1985 | Wetzel | 198/847 |
| 4,604,081 | 8/1986 | Mashimo et al. | 474/205 |
| 4,826,472 | 5/1989 | Sato et al. | 474/205 |
| 4,832,673 | 5/1989 | Nagai et al. | 474/267 |
| 4,891,040 | 1/1990 | Nagai et al. | 474/267 |

Primary Examiner—James J. Bell
Attorney, Agent, or Firm—Armstrong & Kubovcik

[57] ABSTRACT

A woven fabric for covering a tooth part formed on a belt body of a synchronous belt is woven with a lengthwise yarn and a widthwise yarn. The lengthwise yarn is made of a crimped yarn of synthetic fiber or a covering yarn in which a crimped yarn of synthetic fiber is wound around an elastic cord yarn. The widthwise yarn is made of a spun yarn of synthetic fiber or meta-linked type aromatic polyamide fiber. The widthwise yarn expose more to the woven fabric surface than the lengthwise yarn. Thus, the belt life is lengthened and the noise reduced.

6 Claims, 2 Drawing Sheets

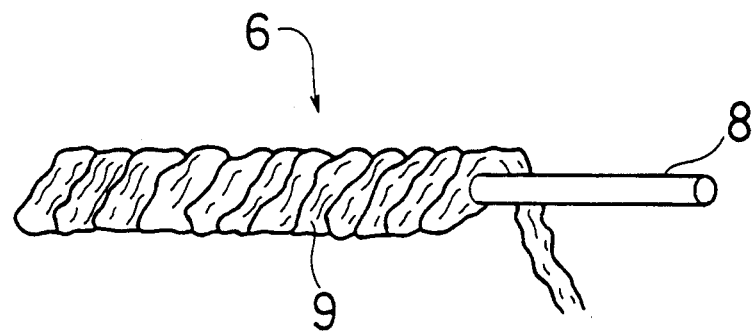
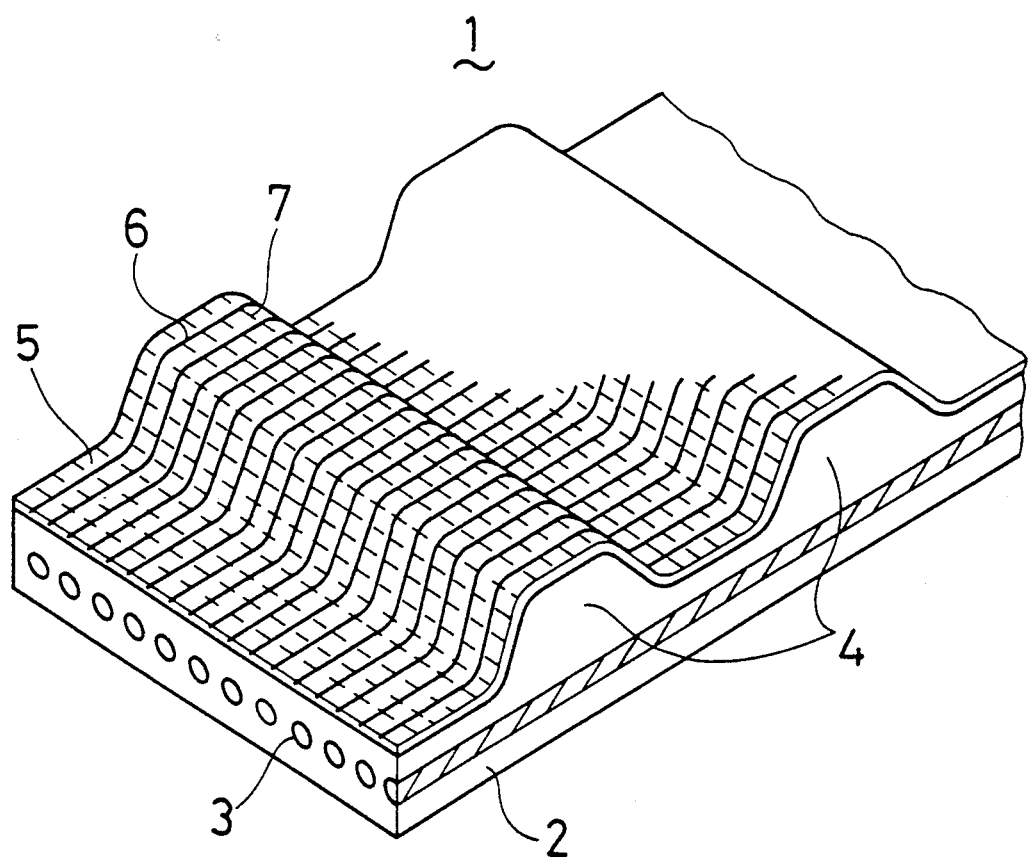

SYNCHRONOUS BELT

BACKGROUND OF THE INVENTION

This invention relates to a synchronous belt in which a tooth part formed on a belt body is covered with a woven fabric, and particularly relates to an improvement of the woven fabric.

A synchronous belt in which a tooth part formed on a belt body is covered with a woven fabric has been used in variable field and, in its turn, has used under sever conditions such as high rotation, high loading, high temperature. Under such conditions, increase in durability thereof is desired since the belt life is shortened because of degradation of the materials of the belt, chip-out of the tooth part and breakage of the tension member in a short period.

In addition, with machine tools for automobiles and home appliance high graded, noise at belt driving is desired to reduce.

In order to enhance the durability of the synchronous belt, it is proposed in Patent Application Laying Open Gazette No. 60-81536 that a synchronous belt is covered with a woven fabric having woolly yarn of high viscosity polyamide fiber. Also proposed in Patent Application Laying Open Gazette No. 55-40319 is that a heat-resisting synthetic fiber of more than 90% of a strength remaining ratio after 400 hours passed under 120° atomospheric temperature is used as one of weft yarn and warp yarn, a synthetic fiber including nylon 6 or nylon 6,6 is used as the other yarn, and the one yarn exposes more to a surface of the woven fabric than the other yarn and vice versa.

In order to reduce the noise, it is proposed in Utility Model Registration Application Laying Open Gazette No. 62-87238 that at least one ply of a rough woven fabric is embedded in the belt body and at least one ply of surface woven fabric is adhered to the surface of the belt body. Also proposed in Utility Model Registration Application Open Gazette No. 63-11949 that a canvas on which only RFL (resorcin formaldehyde latex) adhesion treatment is provided and in which at least a contact surface with a pulley is uncoated with rubber is used to the synchronous belt.

However, instead of the durability ensured, the noise is not reduced in the former two synchronous belts, and vice versa in the latter two synchronous belts. In other words, both the high durability and the low noise are not obtainable in any synchronous belts.

SUMMARY OF THE INVENTION

The present invention is made in view of the above mentioned problems and it is an objects of the invention to enhance the durability and to reduce the noise of a synchronous belt by specifying kinds and structure of yarns composing the woven fabric. Further object of the present invention is to enhance the abrasion resistance and to lessen failures in forming the tooth part of the synchronous belt.

To attain the above object, firstly, a synchronous belt in which a tooth part formed on a belt body is covered with a woven fabric comprises a yarn in a longitudinal direction of the belt and made of a crimped yarn of synthetic fiber and a yarn in a widthwise direction of the belt and made of a spun yarn of synthetic fiber, wherein the woven fabric is woven with the longitudinal yarn and the widthwise yarn. In this case, the widthwise yarn may be made of a spun yarn of meta-linked type aromatic polyamide fiber, and expose more to a surface of the woven fabric than the lengthwise yarn.

Secondary, a synchronous belt in which a tooth part formed on a belt body is covered with a woven fabric comprises a yarn in a longitudinal direction of the belt and made of a covering yarn and a yarn in a widthwise direction of the belt and made of a spun yarn of synthetic fiber, wherein the woven fabric is woven with the lengthwise yarn and the widthwise yarn, and the covering is so composed that a crimped yarn of synthetic fiber is wound around a core yarn of elastic yarn. In this case, also, the spun yarn in the belt width direction may be made of meta-linked type aromatic polyamide expose more to the surface of the woven fabric than the crimped yarn in the longitudinal direction.

BRIEF DESCRIPTION OF THE DRAWINGS

FIG. 1 is a perspective view of a synchronous belt.

FIG. 2 is a view showing a construction of a yarn of a woven fabric in a longitudinal direction of the belt.

DETAILED DESCRIPTION OF THE PREFERRED EMBODIMENTS

FIRST EMBODIMENT

Figure 3:
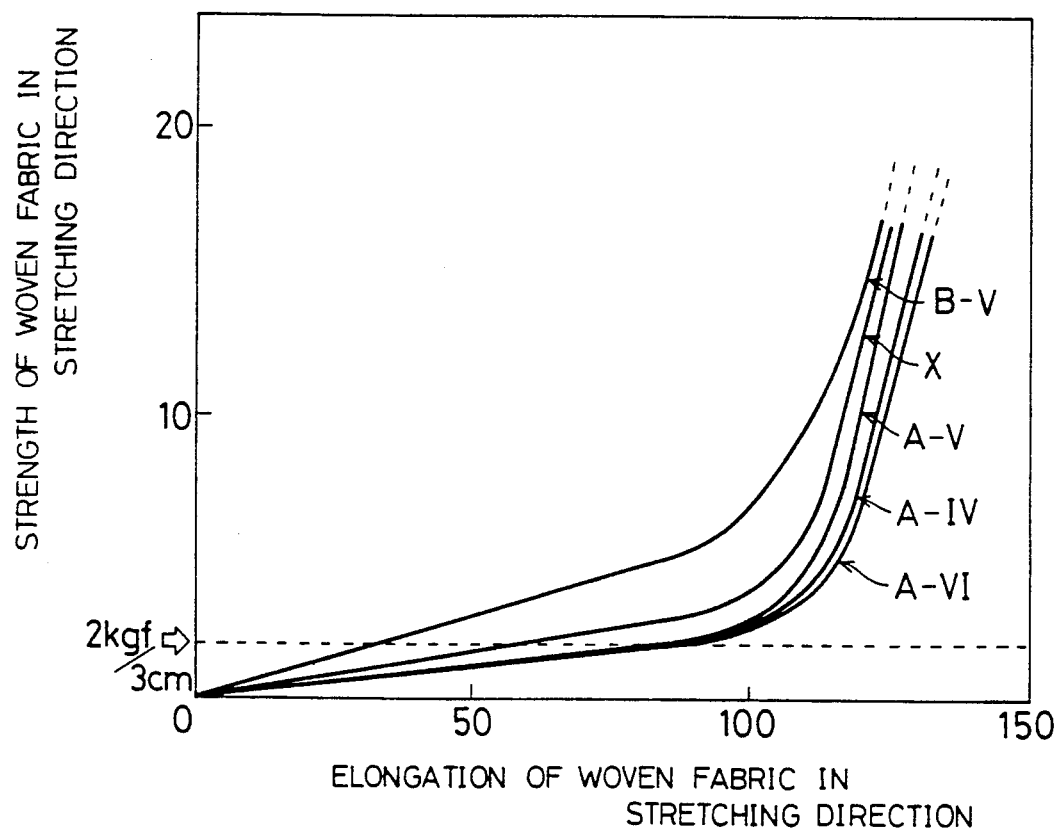
FIG. 3 is a graph showing a relation between a strength and elongation of the woven fabric in a stretching direction.

A first embodiment of the present invention is described below with reference to the accompanying drawings.

FIG. 1 shows a synchronous belt 1 having a belt body 2 according to the first embodiment of the present invention. Embedded in parallel at a pitch line of the belt body 2 are a plurality of tensile cords 3 of low elongation and high strength made of glass fiber, carbon fiber, aromatic polyamide fiber and the like. A tooth part 4 is integrally formed one of surfaces of the belt body 2 and covered with a woven fabric 5.

A single or blended component among NR (natural rubber), SBR (styrene-butadiene rubber), CR (chloroprene rubber), NBR (acrylonitrile-butadiene rubber), CSM (chlorosulfonated polyethylene rubber), H-NBR (hydrogenated nitrile rubber) and the like, or single urethane elastomer is used for the rubber for the belt body 2 and the tooth part 4.

The woven fabric 5 is woven with a lengthwise yarn 6 made of a crimped yarn of synthetic fiber and a widthwise yarn 7 made of a spun yarn of synthetic fiber. The spun yarn is composed of short fibers gathered into tows and has many giggings on its surface.

The materials of the yarns 6 and 7 are nylon fiber, polyester fiber, aromatic polyamide fiber, aromatic polyester fiber and the like. Particularly, the preferable material for the lengthwise yarn 6 is aliphatic synthetic fiber which is easy to be crimped and melting point of which is comparatively low, such as nylon fiber, polyester fiber.

The spun yarn is suitable for the widthwise yarn 7, because the giggins of the spun yarn cushions a shock owing to a contact with a pulley at belt driving. This enhances the durability of the synchronous belt 1, decreasing the noise.

Since the spun yarn has lower strength than that of continuous fiber yarn, the spun yarn is used as the widthwise yarn 7 to which load is not applied and the stretch yarn composed of the crimped yarn of continuous fiber is used as the lengthwise yarn 6 to which load is applied. Thus, the general strength of the woven fabric is maintained, while displaying the cushion property.

Further, the widthwise yarns 7 exposes more to the surface of the woven fabric 5 than the lengthwise yarn 6 in order to enhance the cushion property. As a such weave design, satin weave, modified twill weave, and the like are preferable.

Such a weave design restrains fatigue owing to a shock received by the woven fabric 5 and cushions the shock to the tensile cords 3. As a result, each life of the woven fabric 5 and the tensile cords 3 remarkably increases. In addition, the noise at the shock generated at an engagement of the synchronous belt 1 with a pulley is reduced thanks to the cushion property.

In case where the woven fabric 5 is permeated thoroughly with an adhesion containing much rubber cement or rubber component, for example, RFL, the spun yarn is appropriately gathered into tows without decreasing the cushion property and abrasion is hard to occur. Even without the adhesion treatment, the above property would not be lost as far as the spun yarn is used.

A performance test to two synchronous belts A-I, A-II according to the present invention, a comparative example B-I, and a conventional example X is conducted.

Respective woven fabrics are prepared for the respective belts A-I, A-II, B-I, X. Each construction thereof and property results are respectively indicated in Table 1 and Table 2. In each belt, a warp yarn and a weft yarn are respectively the widthwise yarn 7 and the lengthwise yarn 6.

TABLE 1

|  | A-I | A-II | B-I | X |
|---|---|---|---|---|
| weave design | satin weave | 2/2 twill weave | satin weave | 2/2 twill weave |
| YARN |  |  |  |  |
| warp yarn | nylon spun yarn | nylon spun yarn | nylon filament twist yarn | nylon filament twist yarn |
| weft yarn | nylon crimped yarn | nylon crimped yarn | covering yarn | nylon crimped yarn |
| construction of canvas | 30S/1* 210D/2 100*100/5 cm | 30S/1* 210D/2 100*100/5 cm | 210D/1* (280D + 30S/2) 100*85/ 5 cm | 210D/1* 210D/2 100*100/ 5 cm |

Wherein the covering yarn is made of polyurethane yarn and nylon spun yarn.

TABLE 2

|  | A-I | A-II | B-I | X |
|---|---|---|---|---|
| strength |  |  |  |  |
| warp yarn | 58 | 57 | 79 | 76 |
| weft yarn | 103 | 103 | 54 | 103 |
| elongation |  |  |  |  |
| warp yarn | 21 | 24 | 28 | 28 |
| weft yarn | 141 | 139 | 110 | 120 | unit strength: kgf/3 cm
elongation: %

After a conventional rubber-cement treatment is conducted on each woven fabric in Table 1, the tooth part of the belt body is covered with the woven fabric to obtain the synchronous belt as shown in FIG. 1. In detail, the synchronous belt of 0.656 mm PLD (pitch line differential) and 19 mm belt width with 125 teeth is obtained by a conventional method in which the rubber-cement-treated woven fabric is wound on a toothed cylindrical mold, the tensile cords are spun therearound, an unvulcanized rubber sheet of a set thickness is wound thereon, and rubber is formed to tooth grooves of a dram, applying pressure and heating from outside.

Thereafter, the synchronous belt is trained between driving and driven pulleys both with 18 teeth, with 20 kg tension applied. Then the belt is run under the conditions of 4 PS load, 1000 rpm and atmospheric temperature of 100°. Running time of the belt at which the tooth part is chipped out or broken is shown in Table 3.

TABLE 3

|  | A-I | A-II | B-I | X |
|---|---|---|---|---|
| running time | 251 | 156 | 24 | 79 | unit: hours

As indicated in Table 3, it is clear that each running time (corresponding to the belt life) of the belts A-I, A-II of the present invention is remarkably long, compared with the comparative example B-I and conventional example X. Particularly, the synchronous belt with the woven fabric of satin weave is superior to that of twill weave in its belt life.

The same running test is conducted for measuring a remaining strength of the belt after 100-hour running. The results are indicated in Table 4.

TABLE 4

|  | A-I | A-II | B-I | X |
|---|---|---|---|---|
| strength |  |  |  |  |
| before run | 1040 | 1040 | 1040 | 1040 |
| after run | 852 | 820 | 818 | 652 | unit: kgf/belt

As a result, the belts A-I, A-II of the present invention are superior to the conventional example X in the remaining strength, and particularly the belt A-1 of the present invention is also superior to the comparative one B-I therein.

Further, the noise caused at belt running is measured in the same running test. The results are indicated in Table 5. Wherein, the noise test is conducted under the atomospheric temperature of a room temperature. Each noise volume at 300 Hz (primary meshing frequency) and 600 Hz (secondary meshing frequency) is measured at fixed 100 rpm.

TABLE 5

|  | A-I | A-II | B-I | X |
|---|---|---|---|---|
| 300 Hz | 53 | 57 | 58 | 64 |
| 600 Hz | 64 | 66 | 66 | 75 | unit: dBA

Table 5 teaches that each noise volume of the belts A-1, A-11 of the present invention are almost the same as that of the comparative example B-I but is much lower than that of the conventional one X. In addition, the woven fabric of satin weave displays more noise reducing feature than that of twill weave.

SECOND EMBODIMENT

A synchronous belt 1 according to a second embodiment is the same as in the first embodiment excepting the woven fabric 5. In detail, the synchronous belt is so composed that the tensile cords 3 are embedded in the belt body 2 and the tooth part 4 formed on the belt body 2 is covered with the woven fabric 5. (see FIG. 1)

In the woven fabric 5, the yarn 7 in the widthwise direction of the belt is made of a spun yarn of meta-linked type aromatic polyamide fiber and the yarn 6 in the longitudinal direction thereof is made of a crimped yarn of synthetic fiber as in the first embodiment. The widthwise yarn 7 exposes more to the surface of the woven fabric 5 than the lengthwise yarn 6, also as in the first embodiment.

Since the spun yarn of meta-linked type aromatic polyamide fiber is used as the widthwise yarn 7 of the woven fabric 5, sufficient cushion property is obtained. In other words, the aromatic polyamide fiber is the most preferable fiber since the cushion property is much obtainable in the synthetic fiber of high elasticity. The para-linked type aromatic polyamide fiber, however, cause fibrillary breakage because of high fiber orientation ratio and low abrasion resistance. Thus, the para-linked type aromatic polyamide fiber is unsuitable to the abrasion resistance material. On the contrary, since the meta-linked type aromatic polyamide fiber has sufficient elasticity and low fiber orientation ratio (compared with the para-linked type), the abrasion resistance is superior. Consequently, the meta-linked type aromatic polyamide fiber with high elasticity and high abrasion resistance is used as the yarn 7 in the belt width direction.

Accordingly, in this embodiment, obtainable is the same effects in the first embodiment, namely that the durability of the synchronous belt 1 is enhanced and that the noise is reduced thanks to the cushion property of the widthwise yarn 7 of the woven fabric 5 (giggings on the surface of the spun yarn). In addition, since the meta-linked type aromatic polyamide fiber is used for the widthwise yarn 7, the abrasion resistance is highly enhanced.

The performance test is conducted to a synchronous belt A-III according to the present invention, comparative examples B-II, B-III, B-IV and conventional example X.

Respective woven fabrics are prepared for the respective belts A-III, B-II, B-III, B-IV, X. Each construction thereof and property results are respectively indicated in Table 6 and Table 7. In each belt, the warp yarn and the weft yarn in Table 6 are used as the widthwise yarn and the lengthwise yarn respectively.

TABLE 7-continued

|  | A-III | B-II | B-III | B-IV | X |
|---|---|---|---|---|---|
| weft yarn | 130 | 141 | 110 | 141 | 120 | unit strength: kgf/3 cm
elongation: %

After a conventional rubber-cement treatment is conducted on the woven fabric in Table 6, the tooth part of the belt body is covered with the woven fabric to obtain the synchronous belt, as shown in FIG. 1, of 0.656 mm PLD and 19 mm belt width with 125 teeth. The method of making the belt is the same as in the first embodiment.

Thereafter, the running test under the conditions as in the first embodiment is conducted. Running time of the belt at which the tooth part is chipped out or broken is shown in Table 8.

TABLE 8

|  | A-III | B-II | B-III | B-IV | X |
|---|---|---|---|---|---|
| running time | 350 | 281 | 24 | 251 | 79 | unit: hours

According to Table 8, it is found that the running time (corresponding to the belt life) is long when the spun yarn is used as the warp yarn (widthwise yarn). Further, the spun yarn of meta-linked type aromatic polyamide spun fiber as in the present invention A-III is the most suitable in view of the belt life.

The remaining strength of the belt after 100-hour running is measured in the same running test. The results are indicated in Table 9.

TABLE 9

|  | A-III | B-II | B-III | B-IV | X |
|---|---|---|---|---|---|
| strength |  |  |  |  |  |
| before run | 1040 | 1040 | 1040 | 1040 | 1040 |
| after run | 915 | 920 | 818 | 852 | 652 | unit: kgf/belt

In the result, it is clear that the remaining strength after running of the belt of the present invention is not so reduced. In this point, there is little difference between meta-linked type and para-linked type.

Further measured is the noise volume at the belt running in the same running test. The results are indicated in Table 10. The testing method is the same as in the first embodiment.

TABLE 6

|  | A-III | B-II | B-III | B-IV | X |
|---|---|---|---|---|---|
| weave design | satin weave | satin weave | satin weave | satin weave | 2/2 twill weave |
| YARN |  |  |  |  |  |
| warp yarn | meta-linked type | para-linked type | nylon filament twist yarn | nylon spun yarn | nylon filament twist yarn |
| weft yarn | nylon crimped yarn | nylon crimped yarn | covering yarn | nylon crimped yarn | nylon crimped yarn |
| construction of canvas | 30S/1* 210D/2 100*100/5 cm | 30S/1* 210D/2 100*100/5 cm | 210D/1* (280D + 30S/2) 100*85/5 cm | 30S/1* 210D/2 100*100/5 cm | 210D/1* 210D/2 100*100/5 cm |

Wherein the covering yarn is made of polyurethane yarn and nylon spun yarn. The meta-linked type means meta-linked type aromatic polyamide spun yarn and para-linked type means para-linked type aromatic polyamide spun yarn.

TABLE 7

|  | A-III | B-II | B-III | B-IV | X |
|---|---|---|---|---|---|
| strength |  |  |  |  |  |
| warp yarn | 52 | 102 | 79 | 58 | 76 |
| weft yarn | 101 | 103 | 54 | 103 | 103 |
| elongation |  |  |  |  |  |
| warp yarn | 15 | 8 | 28 | 21 | 28 |

TABLE 10

|  | A-III | B-II | B-III | B-IV | X |
|---|---|---|---|---|---|
| 300 Hz | 51 | 51 | 58 | 53 | 64 |
| 600 Hz | 61 | 60 | 66 | 64 | 75 | unit: dBA

In Table 10, it is found that the noise volume of the belt A-III of the present invention is lower than that of the comparative examples B-III, B-IV and the conventional one X.

THIRD EMBODIMENT

The synchronous belt in a third embodiment is the same as the first embodiment excepting the woven fabric 5. In detail, the synchronous belt 1 is so composed that the tensile cords 3 are embedded in the belt body 2 and the tooth part 4 formed on the belt body 2 is covered with the woven fabric 5 (see FIG. 1).

In the woven fabric 5, the lengthwise yarn 6 is, as shown in FIG. 2 in enlarged scale, made of a covering yarn composed of a core yarn 8 of elastic yarn such as polyurethane, and a crimped yarn 9 of synthetic fiber wound therearound. The widthwise yarn 7 is made of the spun yarn of meta-linked type aromatic polyamide fiber, as in the second embodiment. The widthwise yarn 7 exposes more to the surface of the woven fabric 5 than the lengthwise yarn 6, as in first and second embodiment.

Since the lengthwise yarn 6 is composed of the elastic core yarn 8 and the crimped yarn 8 of synthetic fiber wound therearound, the inside core yarn 8 wound by the crimped yarn 9 can display the elastic function without a contact with the giggings, though the gigging of the widthwise yarn 7 (spun yarn) restrains the crimped yarn 9 for stretching. Thus, the great elongation of the yarn 6 is obtained, ensuring the stretchability by the elastic function of the core yarn 8. This enables a sufficient shrinking treatment, high elongation upon low loading at forming the belt, and a stable formation of the tooth part, reducing the defective tooth part.

In this embodiment, in addition to the same effects as in the first embodiment, namely, that the durability of the synchronous belt 1 is enhanced and the noise reduces by the cushion property of the widthwise yarn 7 (giggings of the surface of the spun yarn) of the woven fabric 5, abrasion resistance is remarkably enhanced, as in the second embodiment, by using meta-linked type aromatic polyamide fiber as the widthwise yarn 7. Further, the stable formation and less defective tooth part can be realized because of the double structure of the lengthwise yarn 6.

A performance test is conducted to the belts A-IV, A-V, A-VI of the present invention, a comparative example B-V and a conventional example X.

The structure and property results of the respective woven fabrics used for each belt are indicated in Table 11 and Table 12 respectively. A relation between strength and elongation (SS) of the woven fabric in a stretching direction is shown in FIG. 3. In each belt, the widthwise yarn and the lengthwise yarn are respectively the warp yarn and the weft yarn in Table 11.

TABLE 11

|  | A-IV | A-V | A-VI | B-V | X |
|---|---|---|---|---|---|
| weave design | satin weave | 2/2 twill weave | satin weave | 2/2 twill weave | 2/2 twill weave |
| YARN |  |  |  |  |  |
| warp yarn | nylon spun yarn | nylon spun yarn | meta-linked type | nylon spun yarn | nylon filament twist yarn |
| weft yarn | core yarn + nylon crimped yarn | core yarn + nylon crimped yarn | core yarn + nylon crimped yarn | nylon crimped yarn | nylon crimped yarn |
| construction of | 30S/1* 280D + 210D/2 | 30S/1* 280D + 210D/2 | 30S/1* 280D + 210D/2 | 30S/1** 210D/2 | 210D/1* 210D/2 |
| canvas | 100*100/5 cm | 100*100/5 cm | 100*100/5 cm | 100*100/5 cm | 100*100/5 cm |

Wherein the meta-linked type means meta-linked type aromatic polyamide spun yarn, and core yarn is made of polyurethane.

TABLE 12

|  | A-IV | A-V | A-VI | B-V | X |
|---|---|---|---|---|---|
| width after crimping treatment | 100 | 100 | 100 | 100 | 100 |
| strength |  |  |  |  |  |
| warp yarn | 56 | 54 | 58 | 57 | 76 |
| weft yarn | 98 | 101 | 100 | 103 | 103 |
| elongation |  |  |  |  |  |
| warp yarn | 23 | 21 | 25 | 24 | 28 |
| weft yarn | 163 | 159 | 167 | 139 | 120 |
| middle elongation at 2 kgf/3 cm (weft yarn) % | 85 | 81 | 87 | 32 | 57 | unit strength: kgf/3 cm
elongation: %

After the rubber-cement treatment is conducted on the woven fabric in Table 11, the tooth part of the belt body is covered with the woven fabric to obtain a synchronous belt, as shown in FIG. 1, of 0.686 mm PLD and 19 mm belt width with 125 teeth. The method of making the belt is the same as in the first embodiment.

Thereafter, the running test under the conditions as in the first embodiment is conducted. Running time of the belt at which the tooth part is chipped out or broken is shown in Table 13.

TABLE 13

|  | A-IV | A-V | A-VI | B-V | X |
|---|---|---|---|---|---|
| running time | 246 | 183 | 327 | 156 | 79 | unit: hours

According to Table 13, it is found that each running time (corresponding to the belt life) of the belts A-IV, A-V, A-VI of the present invention is much longer than the comparative example B-V and the conventional one X, wherein the belt A-VI of the present invention is remarkable.

The remaining strength of the belt after 100-hour running is measured in the same running test. The results are indicated in Table 14.

TABLE 14

|  | A-IV | A-V | A-VI | B-V | X |
|---|---|---|---|---|---|
| strength |  |  |  |  |  |
| before run | 1040 | 1040 | 1040 | 1040 | 1040 |
| after run | 865 | 860 | 870 | 820 | 652 | unit: kgf/belt

In the results, it is clear that the belts A-IV, A-V, A-VI of the present invention is superior to that of the comparative example B-V and the conventional example X in the remaining strength.

Further measured is the noise volume at the belt running in the same running test. The results are indicated in Table 15. The testing method is the same as in the first embodiment.

TABLE 15

|        | A-IV | A-V | A-VI | B-V | X  |
|--------|------|-----|------|-----|----|
| 300 Hz | 53   | 57  | 52   | 57  | 64 |
| 600 Hz | 63   | 64  | 62   | 66  | 75 | unit: dBA

In Table 15, it is found that the noise volume of the belts A-IV, A-V, A-VI of the present invention is lower than that of conventional examples X, though the belts IV, V, VI IV are not so different in the noise volume from the comparative example B-V.

A number of belts with defective tooth par 500 belts is indicated in Table 16.

TABLE 16

|                                    | A-IV | A-V | A-VI | B-V | X |
|------------------------------------|------|-----|------|-----|---|
| number of defective belts per 500 belts | 2    | 5   | 1    | 48  | 7 |

Table 16 teaches that the defective tooth is hard to occur in the belts A-IV, A-V, A-VI of the present invention, compared with the comparative example B-V.

We claim:

1. A synchronous belt in which a tooth part formed on a belt body is covered with a woven fabric, comprising:
   a yarn in a longitudinal direction of the belt and made of a crimped yarn of synthetic fiber; and
   a yarn in a widthwise direction of the belt and made of a spun yarn of synthetic fiber,
   wherein said woven fabric is woven with said lengthwise yarn and said widthwise yarn.

2. A synchronous belt according to claim 1, wherein said widthwise yarn is made of a spun yarn of meta-linked type aromatic polyamide fiber.

3. A synchronous belt according to 1 or 2, wherein said widthwise yarn exposes more to a surface of said woven fabric than said lengthwise yarn.

4. A synchronous belt in which a tooth part formed on a belt body is covered with a woven fabric, comprising:
   a yarn in a longitudinal direction of the belt and made of a covering yarn; and
   a yarn in a widthwise direction of the belt and made of a spun yarn of synthetic fiber,
   wherein said woven fabric is woven with said lengthwise yarn and said widthwise yarn, and said covering is so composed that a crimped yarn of synthetic fiber is wound around a core yarn of elastic yarn.

5. A synchronous belt according to claim 4, wherein said widthwise yarn is made of a spun yarn of meta-linked type aromatic polyamide fiber.

6. A synchronous belt according to 4 or 5, wherein said widthwise yarn exposes more to a surface of said woven fabric than said lengthwise yarn.

* * * * *